US012001151B2

(12) United States Patent
Yang et al.

(10) Patent No.: US 12,001,151 B2
(45) Date of Patent: Jun. 4, 2024

(54) DEVELOPING DEVICE INCLUDING REGULATION MEMBER WITH DIFFERENT DIAMETERS OF CENTRAL PORTION AND BOTH END PORTIONS

(71) Applicant: Hewlett-Packard Development Company, L.P., Spring, TX (US)

(72) Inventors: Seongwoong Yang, Seongnam-si (KR); Youngchae Kim, Seongnam-si (KR); Jinhong Kim, Seongnam-si (KR); Sunghoon Oh, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/039,926

(22) PCT Filed: Mar. 23, 2021

(86) PCT No.: PCT/US2021/023567

§ 371 (c)(1),
(2) Date: Jun. 1, 2023

(87) PCT Pub. No.: WO2022/139860

PCT Pub. Date: Jun. 30, 2022

(65) Prior Publication Data

US 2024/0004325 A1 Jan. 4, 2024

(30) Foreign Application Priority Data

Dec. 21, 2020 (KR) ........................ 10-2020-0179154

(51) Int. Cl.
*G03G 15/08* (2006.01)

(52) U.S. Cl.
CPC ..... *G03G 15/0812* (2013.01); *G03G 15/0808* (2013.01); *G03G 15/0817* (2013.01); *G03G 15/0881* (2013.01); *G03G 15/0898* (2013.01)

(58) Field of Classification Search
CPC ........... G03G 15/0808; G03G 15/0812; G03G 15/0817; G03G 15/0881; G03G 15/0898
See application file for complete search history.

(56) References Cited

U.S. PATENT DOCUMENTS 4,693,587 A 9/1987 Shigenobu et al.
2008/0318748 A1 12/2008 Akama et al.
(Continued)

FOREIGN PATENT DOCUMENTS

CN 101156112 B 7/2010
JP 2003-177600 A 6/2003
(Continued)

*Primary Examiner* — Hoang X Ngo
(74) *Attorney, Agent, or Firm* — Foley & Lardner LLP

(57) ABSTRACT

A developing device may include a housing to accommodate a developing agent, a developing roller to convey the developing agent adhered to an outer periphery of the developing roller to an outside of the housing, a regulation member positioned apart from the developing roller and having a circular cross-sectional shape to regulate a thickness of the developing agent adhered to the developing roller, and a sealing member between the regulation member and the housing to prevent leakage of the developing agent. A diameter of a central portion of the regulation member may be different from diameters of both end portions of the regulation member.

16 Claims, 9 Drawing Sheets

(56) References Cited

U.S. PATENT DOCUMENTS

| | | | | |
|---|---|---|---|---|
| 2013/0272751 | A1 | 10/2013 | Eiki | |
| 2018/0101111 | A1 | 4/2018 | Ohata | |
| 2018/0284642 | A1* | 10/2018 | Okubo | G03G 15/0812 |
| 2019/0025730 | A1* | 1/2019 | Akaike | G03G 15/0813 |
| 2020/0326642 | A1* | 10/2020 | Yoshii | G03G 15/0812 |

FOREIGN PATENT DOCUMENTS

| | | | |
|---|---|---|---|
| JP | 2009-020210 | A | 1/2009 |
| JP | 2009-258276 | A | 11/2009 |
| JP | 2011-017901 | A | 1/2011 |
| JP | 2015-215545 | A | 12/2015 |

* cited by examiner

DEVELOPING DEVICE INCLUDING REGULATION MEMBER WITH DIFFERENT DIAMETERS OF CENTRAL PORTION AND BOTH END PORTIONS

CROSS-REFERENCE TO RELATED APPLICATIONS

This application is filed under 35 U.S.C. § 371 as a U.S. National Stage Application based on PCT International Application No. PCT/US2021/023567, filed Mar. 23, 2021, which claims priority to South Korean Patent Application No. 10-2020-0179154 filed on Dec. 21, 2020, contents of both of which are incorporated herein by reference in their entireties.

BACKGROUND

An electrophotographic image forming apparatus supplies a toner to an electrostatic latent image formed on a photoconductor to form a visible toner image on the photoconductor, transfers the toner image to a print medium, and then fixes the transferred toner image on the print medium to print an image on the print medium. A developing agent is accommodated in a developing device. The developing agent includes a toner and a carrier. The developing agent accommodated in the developing device is adhered to the outer periphery of a developing sleeve by a magnetic force. The toner of the developing agent adhered to the outer periphery of the developing sleeve is supplied to the electrostatic latent image formed on the photoconductor to form the visible toner image on the photoconductor.

DETAILED DESCRIPTION

Figure 1:
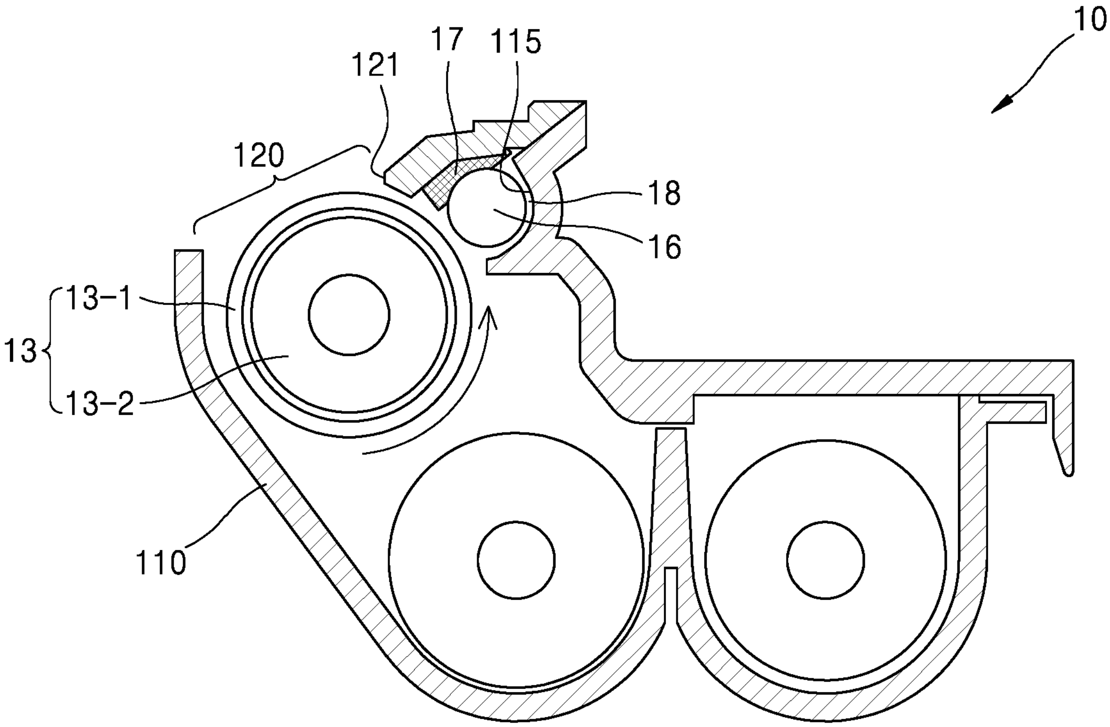
FIG. 1 is a schematic cross-sectional view of an example of a developing device.

An electrophotographic image forming apparatus employing a two-component developing method uses a toner and a carrier as a developing agent. A developing agent is accommodated in a developing device. The developing agent accommodated in the developing device is adhered to an outer periphery of the developing roller. The developing roller supplies a toner of the developing agent to a photoconductor. The developing agent may be adhered to the developing roller by a magnetic force. A regulating blade is positioned apart from the outer periphery of the developing roller and regulates an amount of the developing agent adhered to the outer periphery of the developing roller. The regulating blade has a shape that may maintain flatness and straightness. When a regulating gap between the regulating blade and the developing roller is non-uniform, the amount of the developing agent adhered to a surface of the developing roller may become non-uniform in a longitudinal direction of the developing roller, which may cause an uneven image density.

According to the developing device of the present example, a rod-shaped regulation member forming a regulating gap with the developing roller is used. A sealing member prevents leakage of the developing agent through a gap between the regulation member and a housing. The regulation member may have a shape that compensates for non-uniformity of the regulating gap in a longitudinal direction due to a pressing force of the sealing member. Herein, the longitudinal direction refers to an axial direction of the developing roller.

As an example, the sealing member may press the regulation member in a direction in which the regulating gap becomes smaller, that is, in a direction toward the developing roller. In this case, the regulation member may have a shape in which the regulating gap in a central region is larger than regulating gaps of both end regions of the regulation member. For example, in the case of a regulation member having a circular cross-sectional shape, a diameter of a central portion of the regulation member is less than diameters of both of the end portions of the regulation member. According to such a structure, since the regulating gap in the central region (corresponding to the smaller diameter central portion) is reduced by the pressing force applied by the sealing member, the regulating gap in the central region and the end regions may be made uniform in the longitudinal direction.

As another example, the sealing member may press the regulation member in a direction in which the regulating gap becomes larger, that is, in a direction of away from the developing roller. In this case, the regulation member may have a shape in which the regulating gap in the central region is less than the regulating gaps in both end regions. For example, in the case of the regulation member having the circular cross-sectional shape, the diameter of the central portion of the regulation member is greater than the diameter of both of the end portions of the regulation member. According to such a structure, since the regulating gap in the central region (corresponding to the larger diameter central portion) is increased due to the pressing force applied by the sealing member, the regulating gap in the central region and the end regions may be made uniform in the longitudinal direction.

A difference in the regulating gaps between the central region and both the end regions of the regulation member along the longitudinal direction may be 0.1 millimeters (mm) or less. For example, in the case of the regulation member having the circular cross-sectional shape, a difference between the diameter of the central portion of the regulation member and the diameters of both of the end portions of the regulation member may be 0.2 mm or less. Hereinafter, examples of a developing device and examples of an electrophotographic image forming apparatus using the developing device will now be described in detail with reference to the accompanying drawings. In the following description and drawings, elements having substantially the same function and configuration are denoted by the same reference numerals, and redundant description will be omitted.

Figure 2:
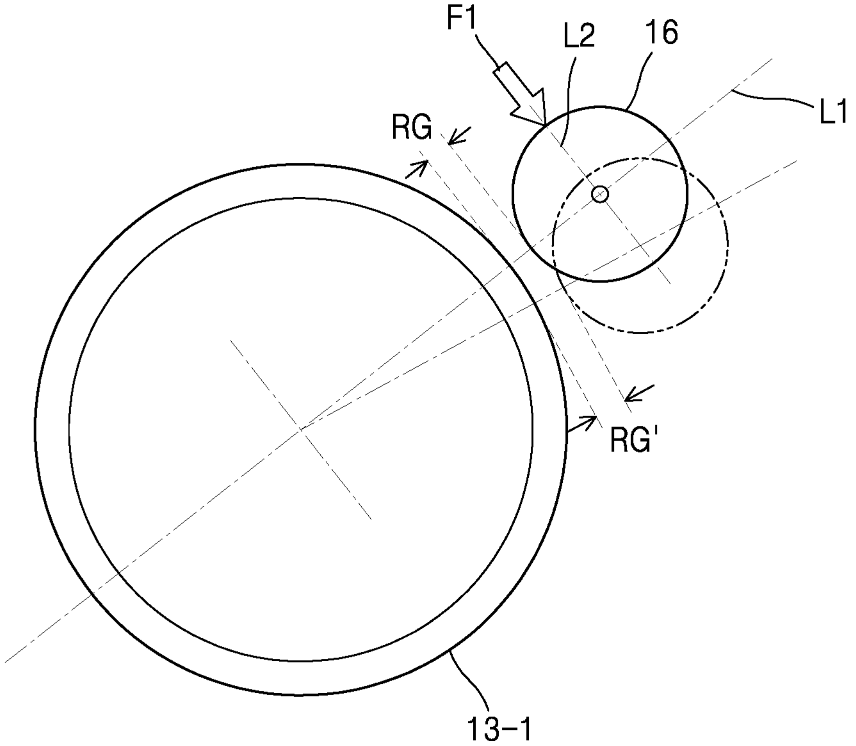
FIG. 2 is a view showing a regulating gap in the example of the developing device shown in FIG. 1.

FIG. 1 is a schematic cross-sectional view of an example of a developing device 10. FIG. 2 is a diagram showing a regulating gap RG. Referring to FIGS. 1 and 2, the developing device 10 may include a housing 110 in which a developing agent is accommodated. The developing device 10 includes a developing roller 13. The developing agent is adhered to an outer periphery of the developing roller 13. The developing roller 13 conveys the developing agent to the outside of the housing 110. The developing device 10 includes a regulation member 16 positioned apart from the developing roller 13 and having a circular cross-sectional shape to regulate a thickness of the developing agent adhered to the developing roller 13. The developing device 10 includes a sealing member 17 blocking a gap 18 between the regulation member 16 and the housing 110 to prevent leakage of the developing agent through the gap 18.

The developing agent may include a carrier and a toner. The carrier may be a magnetic carrier. The developing agent is adhered to the outer periphery of the developing roller 13 by a magnetic force. The developing roller 13 conveys the developing agent to the outside of the housing 110. An opening portion 120 may be provided in the housing 110, and the developing roller 13 may be partially exposed through the opening portion 120. For example, the developing roller 13 may include a developing sleeve 13-1 and a magnet 13-2, where the developing sleeve 13-1 is rotatably supported by the housing 110 and partially exposed to the outside of the housing 110 through the opening portion 120. The magnet 13-2 is arranged inside the developing sleeve 13-1 and attaches the developing agent to the outer periphery of the developing sleeve 13-1 by a magnetic force. The magnet 13-2 is not rotated. The magnet 13-2 may include a plurality of magnetic poles arranged in a rotation direction of the developing sleeve 13-1. The plurality of magnetic poles may include a catch pole attaching the developing agent inside the housing 110 to the developing sleeve 13-1, a regulation pole facing the regulation member 16, a main pole facing the opening portion 120, a feed pole positioned on a downstream side of the main pole (based on the rotation direction of the developing sleeve 13-1), and a separation pole between the feed pole and the catch pole. For example, magnetic polarities of the separation pole, the catch pole, and the main pole may be an S pole, and magnetic polarities of the feed pole and the regulation pole may be an N pole.

For example, the regulation member 16 faces the developing sleeve 13-1 and forms the regulating gap RG. The regulation member 16 may be arranged adjacent to the developing roller 13, that is, an upstream side end portion 121 of the opening portion 120 based on the rotation direction of the developing sleeve 13-1. An amount of the developing agent adhered to the outer periphery of the developing sleeve 13-1 and supplied to the outside of the housing 110 may be regulated by the regulating gap RG. The regulation member 16 may be a rod-shaped member. For example, the regulation member 16 may be a rod-shaped member having various cross-sectional shapes, such as a circular cross-sectional shape, a square cross-sectional shape, or the like. Both of the end portions of the regulation member 16 in a longitudinal direction are supported by the housing 110. In the present example, the regulation member 16 has a circular cross-sectional shape.

A developing agent layer formed by adhering the developing agent to the outer periphery of the developing sleeve 13-1 by a magnetic force of the catch pole is transported to the regulation pole as the developing sleeve 13-1 is rotated. A thickness of the developing agent layer is regulated while the developing agent layer passes through the regulating gap RG between the developing sleeve 13-1 and the regulation member 16, thereby becoming a development agent layer having a constant thickness. The developing agent layer regulated to the constant thickness is conveyed to the main pole as the developing sleeve 13-1 is rotated. A toner from the developing agent layer formed on the surface of the developing sleeve 13-1 is adhered to an electrostatic latent image formed on a surface of a photoconductor by a developing bias voltage applied to the developing sleeve 13-1. The developing agent remaining on the outer periphery of the developing sleeve 13-1 after passing through the main pole is conveyed to the separation pole through the feed pole. The developing agent is separated from the outer periphery of the developing sleeve 13-1 by a repulsive magnetic field formed by the separation pole and the catch pole and falls into the housing 110. With such a circulating structure mentioned above, a developing agent including a new toner may be supplied to the developing sleeve 13-1.

The gap 18 may be formed between the regulation member 16 and an inner wall 115 of the housing 110, the inner wall 115 being adjacent to the regulation member 16. When the developing agent passes through the regulating gap RG after being adhered to the surface of the developing sleeve 13-1, the thickness of the developing agent is regulated. When the developing agent is adhered to the surface of the developing sleeve 13-1 by passing through the gap 18, the thickness of the developing agent layer formed on the surface of the developing sleeve 13-1 may become non-uniform or too thick. In addition, when the developing agent that has passed through the gap 18 leaks to the outside of the housing 110 through the opening portion 120, an image forming apparatus in which the developing device 10 is used may be contaminated. The sealing member 17 prevents the leakage of the developing agent through the gap 18 by blocking the gap 18 between the regulation member 16 and the housing 110. The sealing member 17 may elastically block the gap 18. The sealing member 17 may include, for example, an elastic material such as a sponge, a felt, rubber, or the like, and may be elastically provided between the regulation member 16 and the housing 110. The sealing member 17 may extend in a longitudinal direction and elastically press the regulation member 16.

The amount of the developing agent adhered to the outer periphery of the developing roller 13 and supplied to the outside of the housing 110 should be uniform in the longitudinal direction. To this end, the regulating gap RG should be uniform in the longitudinal direction. As described above, a pressing force is applied to the regulation member 16 by the sealing member 17. Because both of the end portions of the regulation member 16 are supported by the housing 110, an amount of deformation of the regulation member 16 by the pressing force may be very small at both of the end portions and may be the greatest at a central portion of the regulation member 16. The amount of deformation of the regulation member 16 due to the pressing force may increase from both of the end portions to the central portion. Depending on a position of the sealing member 17 with respect to the regulation member 16, a direction of the pressing force may be a direction urging the regulation member 16 toward the developing roller 13, or may be a direction urging the regulation member 16 away from the developing roller 13.

For example, referring to FIG. 2, the sealing member 17 may be installed to press the regulation member 16 in a direction away from the developing roller 13, or more specifically, the developing sleeve 13-1. For example, a line connecting centers of the regulation member 16 and the developing roller 13 is referred to as L1, and a line passing through a center of the regulation member 16 and perpendicular to the line L1 is referred to as L2. When the sealing member 17 is installed so that an application point of a pressing force F1 applied to the regulation member 16 by the sealing member 17 is on a side of the developing roller 13 in a direction along L2, the regulation member 16 is pressed in a direction away from the developing roller 13 by the pressing force F1. In this case, the regulation member 16 is bent as shown by a double-dashed line in FIG. 2. Because both of the end portions of the regulation member 16 are supported by the housing 110, an amount of bending of the end portions caused by the pressing force F1 is very small, and the amount of bending of the central portion of the regulation member 16 caused by the pressing force F1 is the greatest. Accordingly, in the longitudinal direction, a regulating gap RG' of a central region is larger than the regulating gap RG of both end regions. If the non-uniform regulating gap is not compensated for, the amount of the developing agent adhered to the surface of the developing sleeve 13-1 and supplied to the opening portion 120 becomes greater in the central region than that in the both end regions.

Figure 3:
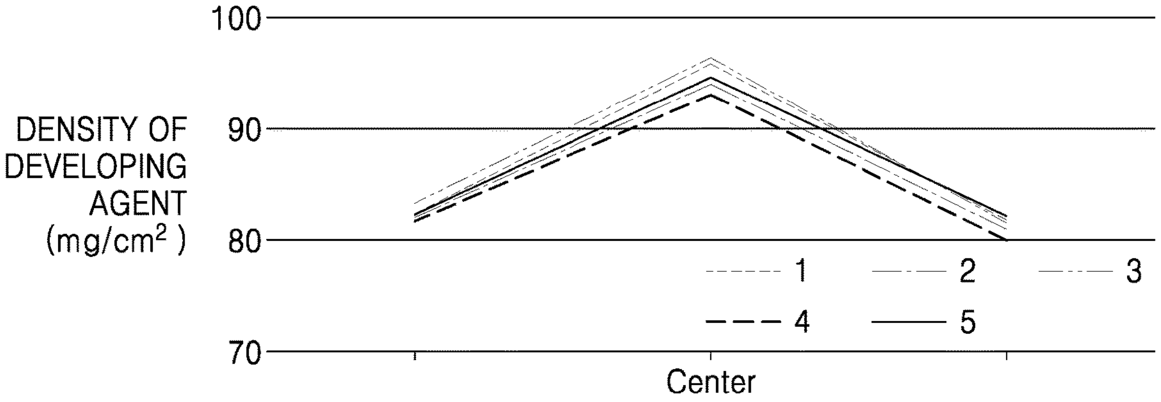
FIG. 3 shows a result of measuring density of a developing agent adhered to a surface of a developing sleeve and supplied to an opening portion when a regulation member having a uniform diameter is applied to the example of the developing device shown in FIG. 1.

Table 1 and FIG. 3 show a result of measuring density of the developing agent adhered to the surface of the developing sleeve 13-1 and supplied to the opening portion 120 when a regulation member having a uniform diameter is applied to the example of the developing device 10 shown in FIG. 1.

TABLE 1

| | One End Portion | Central Portion | The Other End Portion |
|---|---|---|---|
| Average | 82.1 | 94.74 | 81.18 |
| 1 | 82 | 95.7 | 81.8 |
| 2 | 81.8 | 94 | 80.8 |
| 3 | 83.1 | 96.3 | 81.5 |
| 4 | 81.5 | 93.1 | 79.8 |
| 5 | 82.1 | 94.6 | 82 |

Referring to Table 1 and FIG. 3, with respect to the density of the developing agent on the surface of the developing sleeve 13-1, the density of the developing agent at the central region is greater than the density of the developing agent at both the end regions. This is because the regulating gap RG' in the central region is larger than the regulating gap RG in both the end regions. To eliminate such non-uniformity in the density of the developing agent, the regulation member 16 of the present example may have a shape capable of compensating for the non-uniformity of the regulating gap RG due to the pressing force F1 of the sealing member 17.

Figure 4:
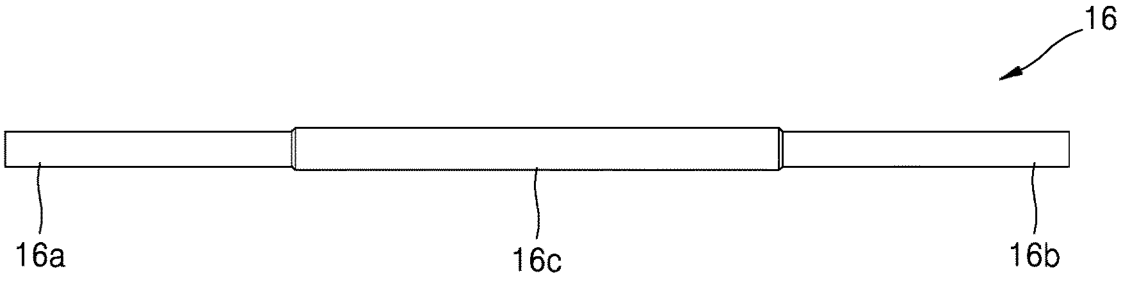
FIG. 4 is a plan view of an example of a regulation member.

FIG. 4 is a plan view of an example of a regulation member 16. The regulation member 16 of the present example has a circular cross-sectional shape. A diameter of a central portion 16*c* of the regulation member 16 is greater than a diameter of each of the end portions 16*a* and 16*b* of the regulation member 16. According to such a structure, under a condition that the pressing force F1 of the sealing member 17 is not applied, a size of the regulating gap RG formed by the developing sleeve 13-1 and the regulation member 16 is less at the central region than a size of the regulating gap RG at both the end regions. When the pressing force F1 of the sealing member 17 is applied, as shown by the double-dashed line in FIG. 2, to push the central portion 16*c* of the regulation member 16 away from the developing sleeve 13-1, the size of the regulating gap RG formed by the developing sleeve 13-1 and the regulation member 16 may be substantially uniform in the longitudinal direction. A difference in the regulating gap RG between the central region and both the end regions may be 0.1 mm or less. To this end, a difference in the diameter between the central portion 16*c* and both of the end portions 16*a* and 16*b* of the regulation member 16 having a circular cross-sectional shape may be 0.2 mm or less.

Figure 5:
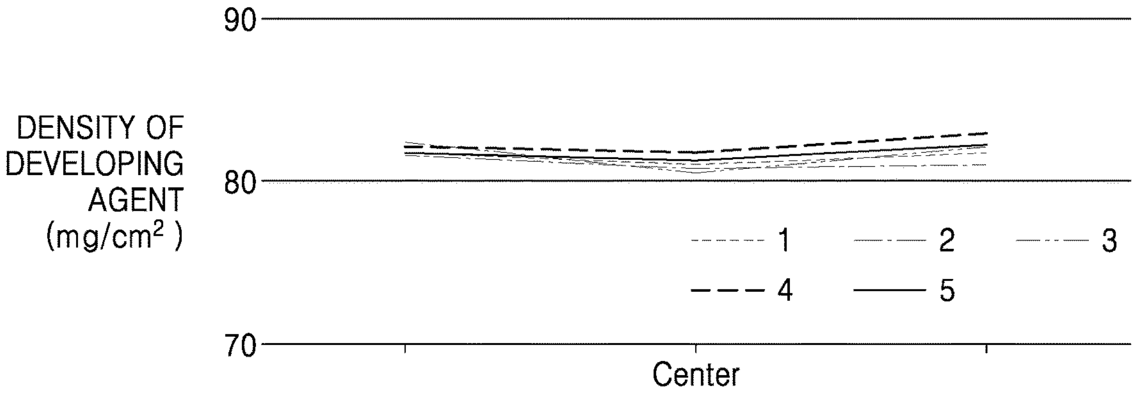
FIG. 5 shows a result of measuring density of a developing agent adhered to a surface of a developing sleeve and supplied to an opening portion when the regulation member shown in FIG. 4 is applied to the example of the developing device shown in FIG. 1.

Table 2 and FIG. 5 show a result of measuring the density of the developing agent adhered to the surface of the developing sleeve 13-1 and supplied to the opening portion 120 when the regulation member 16 shown in FIG. 4 is used in the developing device 10 shown in FIG. 1. The diameter of the central portion 16*c* of the regulation member 16 is greater than the diameter of both of the end portions 16*a* and 16*b* of the regulation member 16 by 0.2 mm.

TABLE 2

| | One End Portion | Central Portion | The Other End Portion |
|---|---|---|---|
| Average | 82.02 | 81.1 | 82.02 |
| 1 | 82.3 | 81.2 | 81.8 |
| 2 | 81.5 | 80.9 | 81 |
| 3 | 82.4 | 80.5 | 82.1 |
| 4 | 82.1 | 81.7 | 83 |
| 5 | 81.8 | 81.2 | 82.2 |

Referring to Table 2 and FIG. 5, with respect to the density of the developing agent on the surface of the developing sleeve 13-1, the density of the developing agent at the central region is substantially the same as the density of the developing agent at the both end regions. This is because the diameter of the central portion 16*c* of the regulation member 16 is formed to be greater than the diameter of both of the end portions 16*a* and 16*b* of the regulation member 16, and thus the regulating gap RG becomes uniform in the longitudinal direction after the regulation member 16 is deformed by the pressing force F1 of the sealing member 17.

In some examples, a plate-shaped blade has been used as the regulation member 16. For example, the blade may be manufactured by pressing a metal plate having a thickness of 1 mm or more. Because an edge of the blade is post-processed after press-processing the blade to manage the straightness of an edge facing the developing sleeve 13-1, it may be difficult to reduce the manufacturing cost of the blade and it may not be easy to maintain a high yield. In addition, because the blade is bent in an "L" shape to maintain flatness and reduce bending, this is disadvantageous in miniaturization of a developing device, and as a result, an area of the developing device to be sealed may be large.

According to some examples of the present disclosure, a rod-shaped regulation member 16, for example, a regulation member 16 having a circular cross-sectional shape, is used. The regulating gap RG may be managed by an outer diameter of the regulation member 16. The outer diameter of the regulation member 16 may be precisely managed by cut-processing. The cut-processing is generally easier to maintain precision than press-processing. In addition, the rod-shaped regulation member 16 is smaller in size than the blade that is bent in an "L" shape, which may be advantageous for the miniaturization of the developing device 10 and may provide a higher degree of freedom in designing the developing device 10, and provide a low material cost. In addition, the non-uniformity of the regulating gap RG due to a pressing force of the sealing member 17 may be easily compensated by making the diameter of the central portion of the regulation member 16 different from the diameters of both of the end portions. Forming the rod-shaped regulation member 16 to have different diameters at the central portion and both of the end portions is relatively easier than processing an edge of the plate-shaped blade in a stepped manner. Accordingly, using the regulation member 16 of the present example, the non-uniformity of the regulating gap RG may be eliminated through easy processing at a low cost, and the degree of freedom in designing the developing device 10 may be improved.

Figure 6:
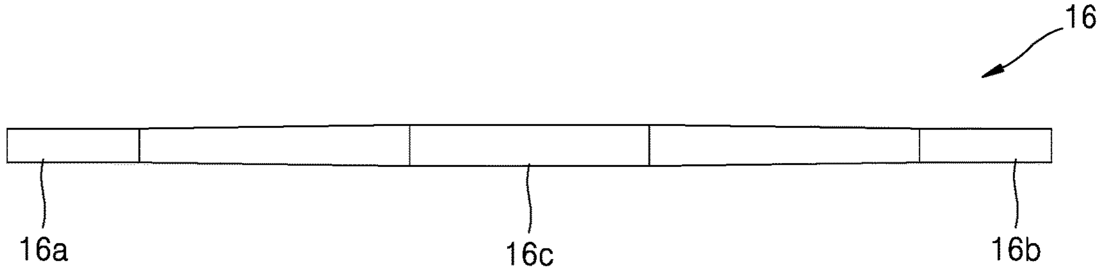
FIG. 6 is a plan view of an example of a regulation member.
Figure 7:
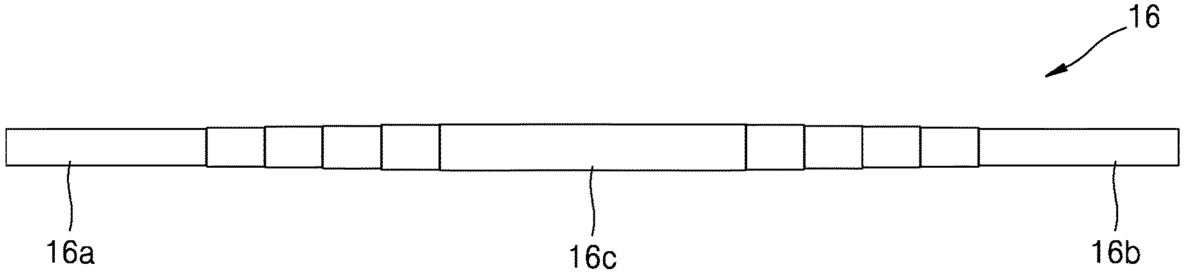
FIG. 7 is a plan view of an example of a regulation member.

The regulation member 16 in which the diameter of the central portion 16*c* is greater than the diameter of both of the end portions 16*a* and 16*b* may be implemented in various ways other than the example shown in FIG. 4. For example, FIG. 6 is a plan view of an example of the regulation member 16. Referring to FIG. 6, the diameter of the central portion 16*c* of the regulation member 16 is greater than the diameter of both of the end portions 16*a* and 16*b* of the regulation member 16. The diameter of the regulation member 16 may be gradually increased along the longitudinal axis of the regulation member 16 from both of the end portions 16*a* and 16*b* to the central portion 16*c*. FIG. 7 is a plan view of another example of the regulation member 16. Referring to FIG. 7, the diameter of the regulation member 16 may be increased in stages along the longitudinal axis of the regulation member 16 from both of the end portions 16*a* and 16*b* to the central portion 16*c*. The number of stages is not particularly limited.

Figure 8:
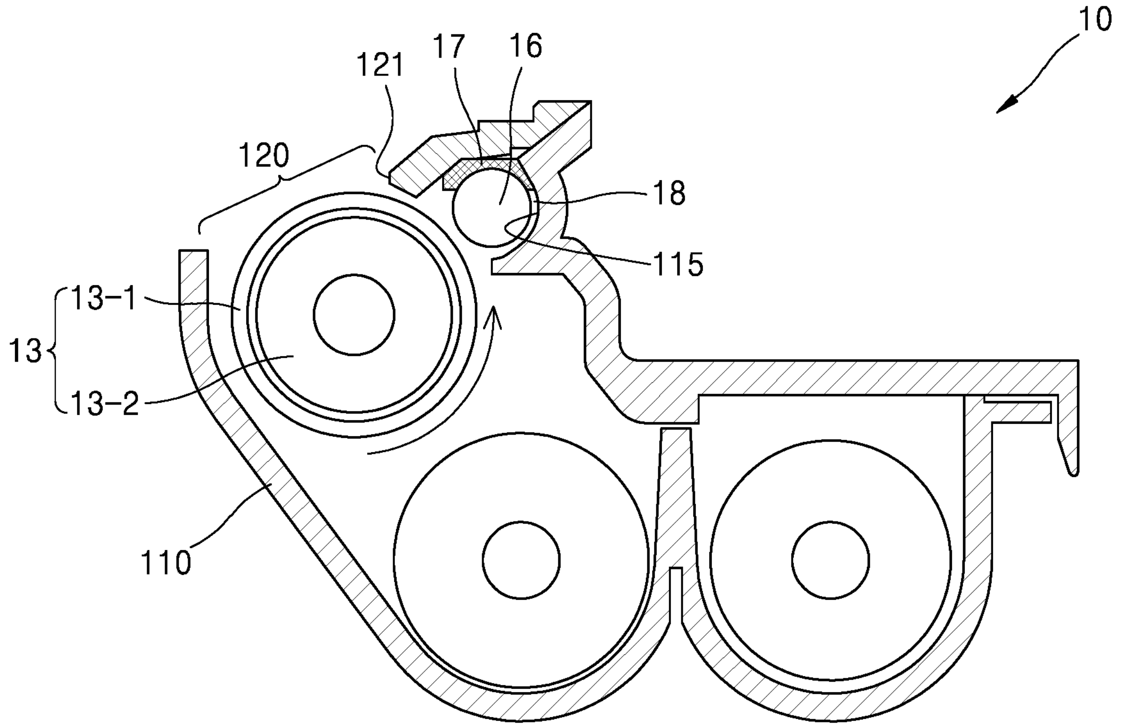
FIG. 8 is a schematic cross-sectional view of an example of a developing device.
Figure 9:
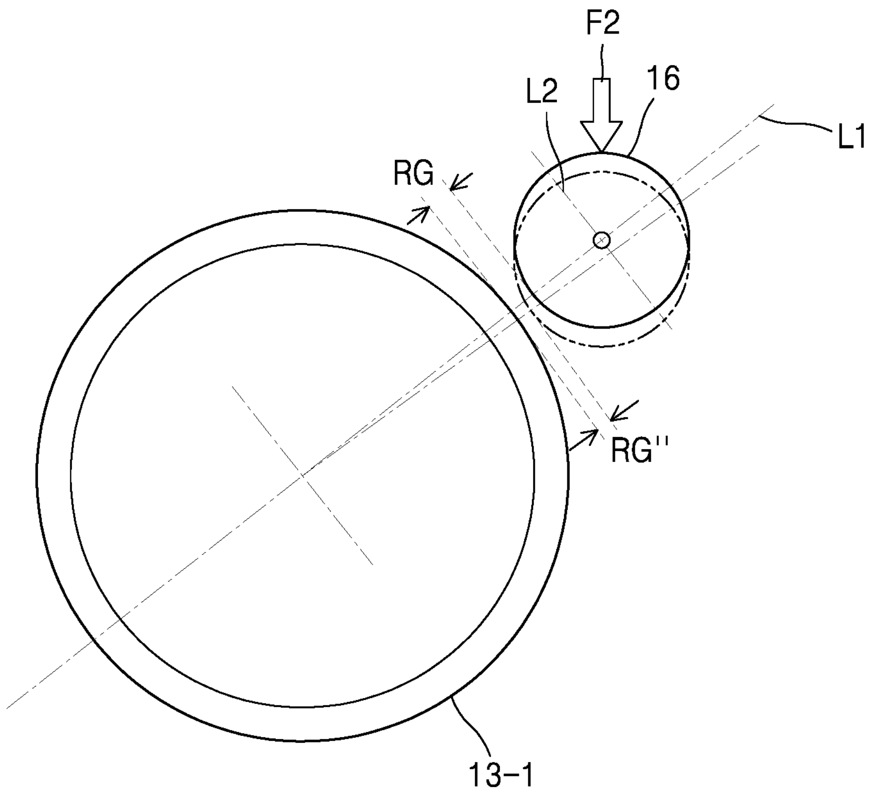
FIG. 9 is a view illustrating a regulating gap in the example of the developing device shown in FIG. 8.

FIG. 8 is a schematic cross-sectional view of an example of the developing device 10. FIG. 9 is a view showing the regulating gap RG in the example of the developing device 10 shown in FIG. 8. In the example of the developing device 10 shown in FIG. 8, which is different from the example of the developing device 10 shown in FIG. 1, the sealing member 17 is installed to press the regulation member 16 in a direction toward the developing roller 13, and more specifically, the developing sleeve 13-1. For example, the line connecting centers of the regulation member 16 and the developing roller 13 is referred to as L1, and the line passing through a center of the regulation member 16 and perpendicular to the line L1 is referred to as L2. When the sealing member 17 is installed so that an application point of a pressing force F2 applied to the regulation member 16 by the sealing member 17 is angled with respect to L2, the regulation member 16 is pressed in a direction toward to the developing roller 13 by the pressing force F2. In this case, the regulation member 16 is bent as shown by a double-dashed line in FIG. 9. Because both of the end portions of the regulation member 16 are supported by the housing 110, the amount of bending at the end portions caused by the pressing force F2 is very small, and the amount of bending of the central portion of the regulation member 16 caused by the pressing force F2 is the greatest. Accordingly, a regulating gap RG" of the central region is less than the regulating gap RG of both the end regions. If the non-uniform regulating gap is not compensated for, the amount of the developing agent adhered to the surface of the developing sleeve 13-1 and supplied to the opening portion 120 becomes less in the central region than that in both the end regions. Table 3 and FIG. 10 show a result of measuring density of the developing agent adhered to the surface of the developing sleeve 13-1 and supplied to the opening portion 120 when a regulation member having uniform diameter is applied to the example of the developing device 10 shown in FIG. 8.

TABLE 3

| | One End Portion | Central Portion | The Other End Portions |
|---|---|---|---|
| Average | 82 | 59.12 | 80.72 |
| 1 | 83.1 | 58.7 | 80.5 |
| 2 | 81.5 | 59.3 | 81.7 |
| 3 | 82.1 | 59.2 | 80.1 |
| 4 | 82 | 58.9 | 80.3 |
| 5 | 81.3 | 59.5 | 81 |

Figure 10:
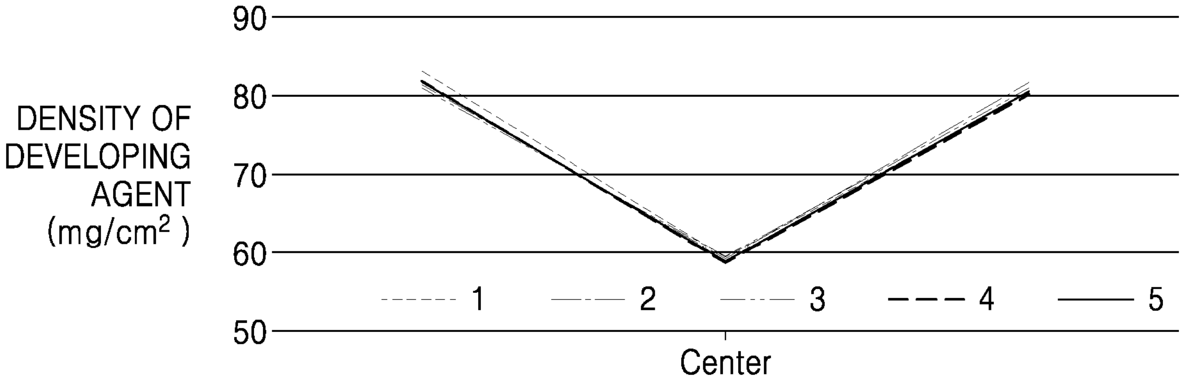
FIG. 10 shows a result of measuring density of a developing agent adhered to a surface of a developing sleeve and supplied to an opening portion when a regulation member having a uniform diameter is applied to the example of the developing device shown in FIG. 8.
Figure 11:
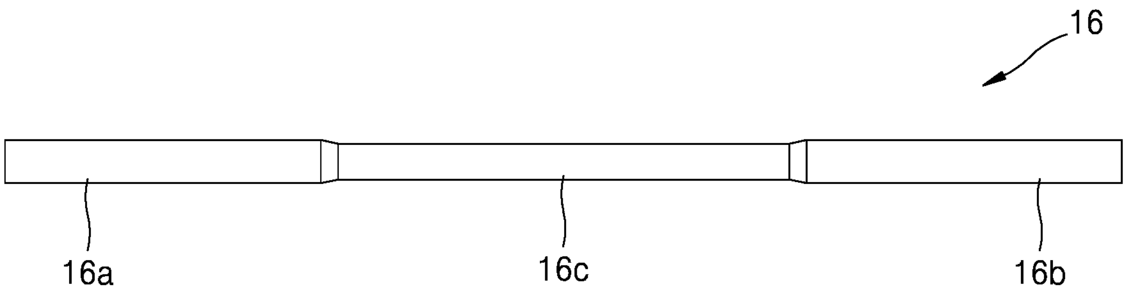
FIG. 11 is a plan view of an example of a regulation member.

Referring to Table 3 and FIG. 10, with respect to the density of the developing agent on the surface of the developing sleeve 13-1, the density of the developing agent at the central region is less than the density of the developing agent at both the end regions. This is because the regulating gap RG" in the central region is less than the regulating gap RG in the both end regions. To eliminate such non-uniformity in the density of the developing agent, the regulation member 16 of the present example may have a shape capable of compensating for the non-uniformity of the regulating gap RG due to the pressing force F2 of the sealing member 17. FIG. 11 is a plan view of an example of the regulation member 16. The regulation member 16 of the present example has a circular cross-sectional shape. The diameter of the central portion 16*c* of the regulation member 16 is less than the diameter of both of the end portions 16*a* and 16*b* of the regulation member 16. According to such a structure, under a condition that the pressing force of the sealing member 17 is not applied, a size of the regulating gap RG formed by the developing sleeve 13-1 and the regulation member 16 is greater at the central region than that at the both end regions. When the pressing force of the sealing member 17 is applied, as shown by the double-dashed line in FIG. 9, because the central portion 16*c* of the regulation member 16 is pressed toward the developing sleeve 13-1, the regulating gap RG formed by the developing sleeve 13-1 and the regulation member 16 may be substantially uniform in the longitudinal direction. A difference in the regulating gap RG between the central region and the both end regions may be 0.1 mm or less. To this end, a difference in the diameter between the central portion 16*c* and both of the end portions 16*a* and 16*b* of the regulation member 16 having a circular cross-sectional shape may be 0.2 mm or less.

Figure 12:
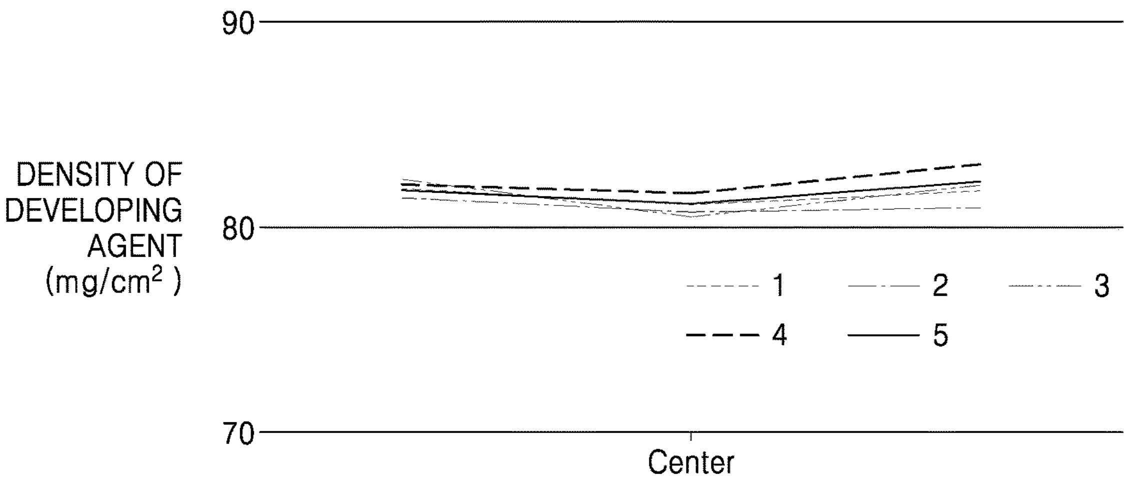
FIG. 12 shows a result of measuring density of a developing agent adhered to a surface of a developing sleeve and supplied to an opening portion when the regulation member shown in FIG. 11 is applied to the example of the developing device shown in FIG. 8.

Table 4 and FIG. 12 show a result of measuring the density of the developing agent adhered to the surface of the developing sleeve 13-1 and supplied to the opening portion 120 when the regulation member 16 shown in FIG. 11 is applied to the example of the developing device 10 shown in FIG. 8. The diameter of the central portion 16*c* of the regulation member 16 is less than the diameter of both of the end portions 16*a* and 16*b* of the regulation member 16 by 0.2 mm. FIG. 12 is a graph showing a result of Table 4.

TABLE 4

| | One End Portion | Central Portion | The Other End Portions |
|---|---|---|---|
| Average | 81.18 | 82.06 | 82.02 |
| 1 | 80.9 | 81.8 | 81.6 |
| 2 | 83.1 | 82.1 | 81.2 |
| 3 | 82.5 | 82.3 | 82.4 |
| 4 | 82.1 | 81.7 | 83.1 |
| 5 | 82.3 | 82.4 | 81.8 |

Referring to Table 4 and FIG. 12, with respect to the density of the developing agent on the surface of the developing sleeve 13-1, the density of the developing agent at the central region is substantially the same as the density of the developing agent at both the end regions. This is because the diameter of the central portion 16*c* of the regulation member 16 is formed to be less than the diameter of both of the end portions 16*a* and 16*b* of the regulation member 16, and thus the regulating gap RG becomes uniform in the longitudinal direction after the regulation member 16 is deformed by the pressing force of the sealing member 17.

Figure 13:
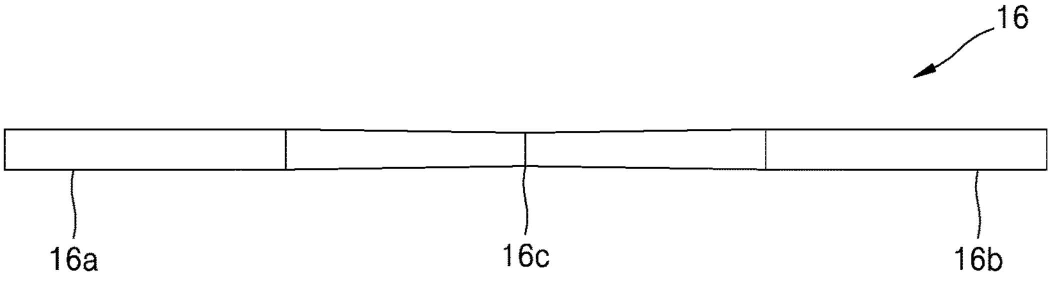
FIG. 13 is a plan view of an example of a regulation member.
Figure 14:
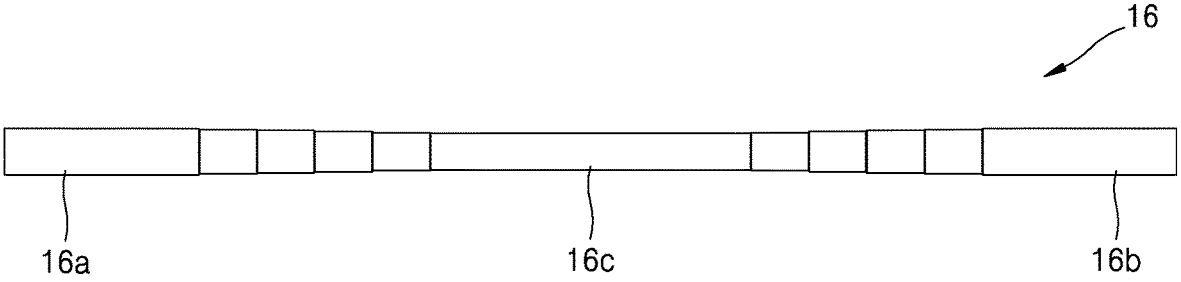
FIG. 14 is a plan view of an example of a regulation member.

The regulation member 16 in which the diameter of the central portion 16*c* is less than the diameter of both of the end portions 16*a* and 16*b* may be implemented in various ways other than the example shown in FIG. 11. For example, FIG. 13 is a plan view of an example of the regulation member 16. Referring to FIG. 13, the diameter of the central portion 16*c* of the regulation member 16 is less than the diameters of both of the end portions 16*a* and 16*b* of the regulation member 16. The diameter of the regulation member 16 may be gradually decreased from both of the end portions 16*a* and 16*b* to the central portion 16*c*. FIG. 14 is a plan view of another example of the regulation member 16. Referring to FIG. 14, the diameter of the regulation member 16 may be decreased in stages from both of the end portions 16*a* and 16*b* to the central portion 16*c*. The number of stages is not particularly limited.

Figure 15:
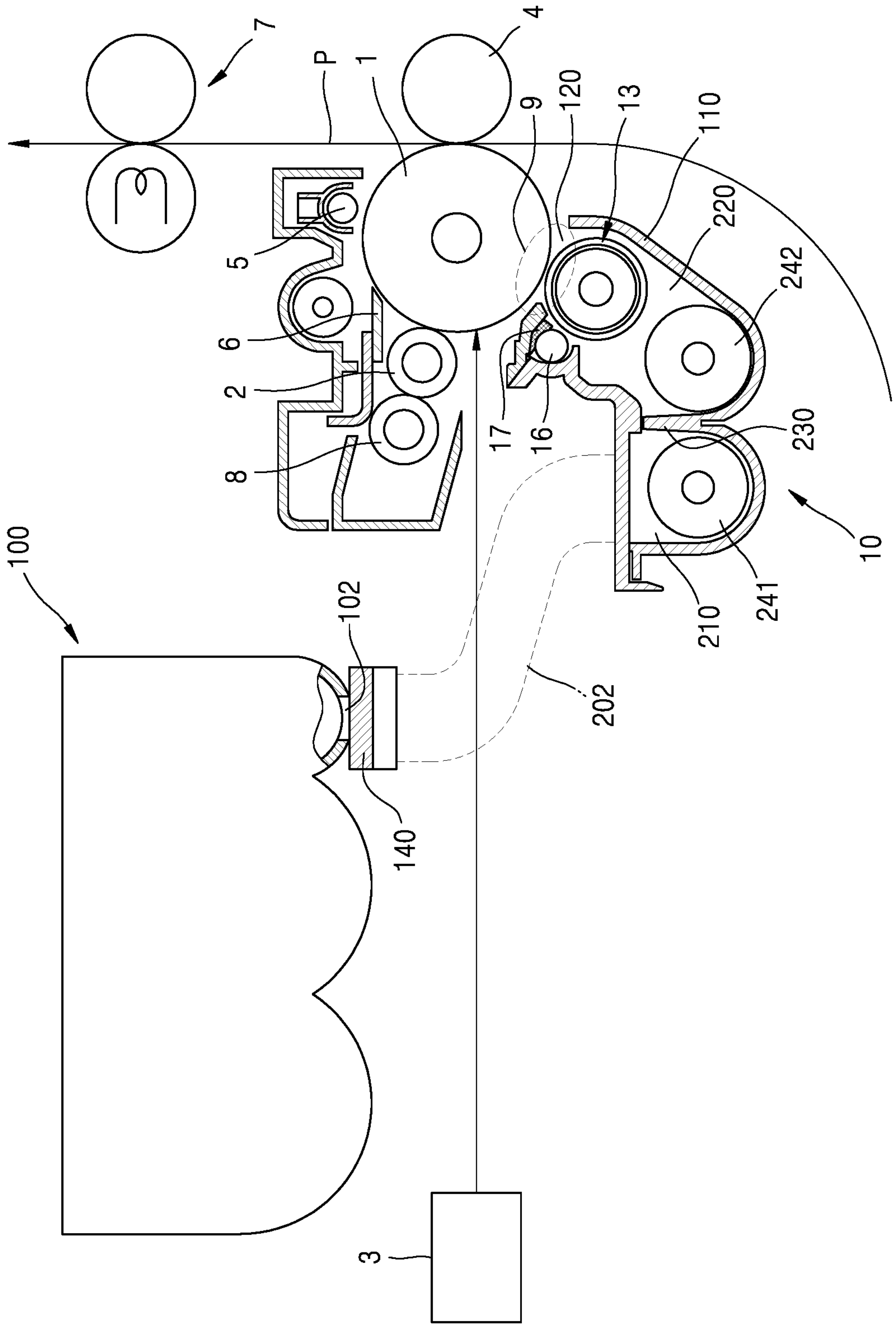
FIG. 15 is a schematic configuration diagram of an example of an electrophotographic image forming apparatus using a developing device.

FIG. 15 is a schematic configuration diagram of an example of an electrophotographic image forming apparatus using the developing device 10. The image forming apparatus of the present example is a monochromatic image forming apparatus using a two-component developing agent including a toner and a magnetic carrier. For example, the color of the toner is black. Referring to FIG. 15, the image forming apparatus may include an optical scanner 3, a photoconductive drum 1, the developing device 10, a transfer unit, and a fusing unit 7.

The photoconductive drum 1 is an example of a photoconductor on which an electrostatic latent image is formed. The photoconductive drum 1 may include a cylindrical metal pipe and a photoconductive layer having photoconductivity formed on an outer periphery of the cylindrical metal pipe. A charging roller 2 is an example of a charger which charges a surface of the photoconductive drum 1 to have a uniform surface electric potential. The charging roller 2 is in contact with the photoconductive drum 1 and rotated, and a charging bias voltage is applied to the charging roller 2. A corona charger may be used that charges the surface of the photoconductive drum 1 by applying a bias voltage between a flat electrode and a wire electrode to cause corona discharge. A cleaning roller 8 removes foreign substances from a surface of the charging roller 2. A cleaning blade 6 removes a toner remaining on the surface of the photoconductive drum 1 after a transfer operation. A charge eliminator 5 removing a residual electric potential on the photoconductive drum 1 may be arranged on an upstream side of the cleaning blade based on a rotation direction of the photoconductive drum 1. The charge eliminator 5 may, for example, irradiate light onto the surface of the photoconductive drum 1.

The optical scanner 3 forms an electrostatic latent image by irradiating light corresponding to image information onto the surface of the photoconductive drum 1 which is charged. As an example, the optical scanner 3 can include a laser scanning unit (LSU), which scans the photoconductive drum 1 by deflecting light irradiated from a laser diode in a main scanning direction by using a polygon mirror. As an example, the optical scanner 3 can include a bar-shaped optical scanner that has a plurality of light emitting devices (LEDs) that are driven on/off in response to the image information. The LEDs are arranged in the main scanning direction.

The developing device 10 may be an integrated developing device including the photoconductive drum 1 and the developing roller 13. The developing device 10 mixes and stirs a developing agent, for example, a toner and a carrier. The developing roller 13 supplies the toner to an electrostatic latent image formed on the photoconductive drum 1 to form a visible toner image on the surface of the photoconductive drum 1. The housing 110 of the developing device 10 may be divided into an agitating chamber 210 and a developing chamber 220 that are parallel to each other. The opening portion 120 communicating with the outside of the developing device 10 may be provided in the developing chamber 220. A first agitator 241 is installed in the agitating chamber 210. The developing roller 13 and a second agitator 242 are installed in the developing chamber 220. The developing roller 13 is partially exposed to the outside of the housing 110 through the opening portion 120 and faces the photoconductive drum 1. The agitating chamber 210 and the developing chamber 220 are separated from each other by a partition 230 extending in an axial direction of the developing roller 13. Openings (not shown) are respectively provided at both of the end portions of the partition 230 in the longitudinal direction of the partition 230, that is, in the axial direction of the developing roller 13. The agitating chamber 210 and the developing chamber 220 are connected to each other through the openings. Each of the first and second agitators 241 and 242 may include an auger having an axis extending in the axial direction of the developing roller 13, and a spiral wing formed on an outer periphery of the axis. When the first agitator 241 is rotated, the developing agent inside the agitating chamber 210 is conveyed in the axial direction of the developing roller 13 (a first direction) by the first agitator 241 and is conveyed to the developing chamber 220 through an opening provided near one end portion of the partition 230. The developing agent in the developing chamber 220 is conveyed in a second direction, which is a direction opposite to the first direction, by the second agitator 242 and is conveyed to the agitating chamber 210 through an opening provided near the other end portion of the partition 230. Accordingly, the developing agent is circulated along the agitating chamber 210 and the developing chamber 220, and is supplied to the developing roller 13 positioned in the developing chamber 220 during a circulation operation.

The developing roller 13 may include the developing sleeve 13-1 and the magnet 13-2, wherein the developing sleeve 13-1 is rotatably supported by the housing 110, and the magnet 13-2 is fixedly arranged inside the developing sleeve 13-1. The developing roller 13 conveys, through the opening portion 120, the developing agent including the toner and the carrier to a development region 9 facing the photoconductive drum 1. The toner is attached to the carrier by an electrostatic force, and the carrier is attached to the surface of the developing sleeve 13-1 by a magnetic force of the magnet 13-2. Accordingly, a developing agent layer is formed on the surface of the developing sleeve 13-1. The developing sleeve 13-1 may be positioned to be apart from the photoconductive drum 1 by a development gap. The development gap may be set to tens of micrometers to hundreds of micrometers. The developing agent adhered to the surface of the developing sleeve 13-1 is regulated in thickness by the regulation member 16 and is conveyed to the development region 9 through the opening portion 120. Depending on a direction of a pressing force to be applied to the regulation member 16 by the sealing member 17, diameters of a central portion and both of the end portions of the regulation member 16 may be different from each other. The toner is moved from the developing sleeve 13-1 to the photoconductive drum 1 by a developing bias voltage applied between the developing sleeve 13-1 and the photoconductive drum 1, and a visible toner image is formed on the surface of the photoconductive drum 1.

A transfer roller 4 is an example of a transfer unit that transfers the toner image formed on the photoconductive drum 1 to a print medium P. The transfer roller 4 faces the photoconductive drum 1 to form a transfer nip, and a transfer bias voltage is applied to the transfer roller 4. The toner image developed on the surface of the photoconductive drum 1 is transferred to the print medium P by an electric field formed between the photoconductive drum 1 and the transfer roller 4 by the transfer bias voltage. A corona transfer unit using corona discharge may be also used to replace the transfer roller 4. The toner image transferred to the print medium P is attached to the print medium P by an electrostatic force. The fusing unit 7 fuses the toner image on the print medium P by applying heat and pressure.

According to such a structure, a uniform regulating gap RG in the longitudinal direction may be implemented by using the regulation member 16 having different diameters of the central portion and both of the end portions. Accordingly, a printed image having a uniform image density in the longitudinal direction may be obtained. In addition, because the rod-shaped regulation member 16 is used, a high degree of freedom in designing the developing device 10 may be obtained, and a manufacturing cost may also be reduced.

When the toner in the developing device 10 is consumed, the toner may be supplied from a toner container 100 to the developing device 10. A toner outlet 102 is provided in the toner container 100. A conveying member conveying a toner to the toner outlet 102 may be provided in the toner container 100. The toner container 100 may have a shutter 140 that selectively opens and closes the toner outlet 102. The toner outlet 102 and the developing device 10 may be connected by a toner supply member 202. According to such a structure, the toner may be supplied from the toner container 100 to the developing device 10.

It should be understood that examples described herein should be considered in a descriptive sense only and not for purposes of limitation. Descriptions of features or aspects within each example should typically be considered as available for other similar features or aspects in other examples. While one or more examples have been described with reference to the figures, it will be understood by those of ordinary skill in the art that various changes in form and details may be made therein without departing from the spirit and scope as defined by the following claims.

What is claimed is:

1. A developing device comprising:

a housing to accommodate a developing agent;

a developing roller to convey the developing agent adhered to an outer periphery of the developing roller to an outside of the housing; and a regulation member positioned apart from the developing roller and having a circular cross-sectional shape to regulate a thickness of the developing agent adhered to the developing roller, wherein a central portion of the regulation member has a first diameter different from a diameter of each of end portions of the regulation member.

2. The developing device of claim 1, wherein a difference between the first diameter of the central portion of the regulation member and the diameter of each of the end portions of the regulation member is 0.2 millimeters or less.

3. The developing device of claim 1, further comprising a sealing member to prevent leakage of the developing agent through a gap between the regulation member and the housing by blocking the gap.

4. The developing device of claim 3, wherein a sealing member presses the regulation member in a direction toward the developing roller, and the first diameter of the central portion is less than the diameter of each of the end portions.

5. The developing device of claim 4, wherein the regulation member decreases in diameter along a longitudinal axis of the regulation member from both of the end portions to the central portion.

6. The developing device of claim 4, wherein the regulation member decreases in diameter in stages along a longitudinal axis of the regulation member from both of the end portions to the central portion.

7. The developing device of claim 3, wherein a sealing member presses the regulation member in a direction away from the developing roller, and the first diameter of the central portion is greater than the diameter of each of the end portions.

8. The developing device of claim 7, wherein the regulation member increases in diameter along a longitudinal axis of the regulation member from both of the end portions to the central portion.

9. The developing device of claim 7, wherein the regulation member increases in diameter along a longitudinal axis of the regulation member in stages from both of the end portions to the central portion.

10. The developing device of claim 1, wherein the housing has an opening portion, and the developing roller comprises a developing sleeve and a magnet, wherein the developing sleeve is rotatably supported by the housing and is partially exposed to the outside of the housing through the opening portion, and the magnet is arranged inside the developing sleeve and provides a magnetic force to cause adherence of the developing agent to an outer periphery of the developing sleeve.

11. The developing device of claim 10, wherein the regulation member is arranged at an upstream side end portion of the opening portion based on a rotation direction of the developing sleeve.

12. An image forming apparatus comprising:

a photoconductive drum; and a developing device to supply a developing agent to an electrostatic latent image formed on the photoconductive drum to develop the electrostatic latent image, wherein the developing device comprises:

a housing to accommodate the developing agent;

a developing roller to convey the developing agent adhered to an outer periphery of the developing roller to an outside of the housing; and a regulation member positioned apart from the developing roller and having a circular cross-sectional shape, wherein a first diameter of a central portion of the regulation member is different from diameters of both of end portions of the regulation member, the regulation member to regulate a thickness of the developing agent adhered to the developing roller.

13. The image forming apparatus of claim 12, wherein a difference between the first diameter of the central portion and the diameter of each of the end portions of the regulation member is 0.2 millimeters or less.

14. The image forming apparatus of claim 12, further comprising a sealing member to prevent leakage of the developing agent through a gap between the regulation member and the housing by elastically blocking the gap.

15. The image forming apparatus of claim 14, wherein the sealing member presses the regulation member in a direction toward the developing roller, and the first diameter of the central portion is less than the diameter of each of the end portions.

16. The image forming apparatus of claim 14, wherein the sealing member presses the regulation member in a direction away from the developing roller, and the first diameter of the central portion is greater than the diameter of each of the end portions.

* * * * *